United States Patent
Fleureau et al.

(10) Patent No.: US 11,095,920 B2
(45) Date of Patent: Aug. 17, 2021

(54) METHOD AND APPARATUS FOR ENCODING A POINT CLOUD REPRESENTING THREE-DIMENSIONAL OBJECTS

(71) Applicant: InterDigital CE Patent Holdings, SAS, Paris (FR)

(72) Inventors: Julien Fleureau, Cesson-Sevigne (FR); Bertrand Chupeau, Cesson-Sevigne (FR); Franck Thudor, Cesson-Sevigne (FR)

(73) Assignee: InterDigital CE Patent Holdgins, SAS, Paris (FR)

( * ) Notice: Subject to any disclaimer, the term of this patent is extended or adjusted under 35 U.S.C. 154(b) by 0 days.

(21) Appl. No.: 16/769,807

(22) PCT Filed: Nov. 29, 2018

(86) PCT No.: PCT/EP2018/082954
§ 371 (c)(1),
(2) Date: Jun. 4, 2020

(87) PCT Pub. No.: WO2019/110405
PCT Pub. Date: Jun. 13, 2019

(65) Prior Publication Data
US 2020/0374559 A1    Nov. 26, 2020

(30) Foreign Application Priority Data
Dec. 5, 2017    (EP) .................................... 17306705

(51) Int. Cl.
*H04N 19/597*    (2014.01)
*G06T 9/00*    (2006.01)

(52) U.S. Cl.
CPC ............. *H04N 19/597* (2014.11); *G06T 9/00* (2013.01)

(58) Field of Classification Search
None
See application file for complete search history.

(56) References Cited

U.S. PATENT DOCUMENTS 9,600,933 B2    3/2017    Wu et al.
10,484,697 B2    11/2019    Grasmug et al.
(Continued)

FOREIGN PATENT DOCUMENTS

| CN | 101268945 A | 9/2008 |
| CN | 101488230 A | 7/2009 |

(Continued)

OTHER PUBLICATIONS

Anonymous, "Part 11: Wireless LAN Medium Access Control (MAC) and Physical Layer (PHY) Specifications Amendment 1: Fast Initial Link Setup", IEEE Standard for Information technology—Telecommunications and information exchange between systems Local and metropolitan area networks—Specific requirements, IEEE Std 802.11ai™-2016 (Amendment to IEEE Std 802.11™-2016), Apr. 14, 2017, 164 pages.

(Continued)

*Primary Examiner* — Lindsay J Uhl
(74) *Attorney, Agent, or Firm* — Condo Roccia Koptiw LLP

(57) ABSTRACT

A colored 3D scene is encoded as one or two patch atlas images. Points of the 3D scene belonging a part of the space defined according to a truncated sphere center on a point of view and visible from this point of view are iteratively projected onto projection maps. At each iteration the projected part is removed from the 3D scene and the truncated sphere defining the next part of the scene to be projected is rotated. Once the entirety of the 3D scene is projected on a set of projection maps, pictures are determined within these maps. A picture, also called patch, is a cluster of depth consistent connected pixels. Patches are packed in a depth (Continued)

and a color atlas associated with data comprising an information relative to the rotation of the truncated sphere, so, a decoder can retrieve the projection mapping and proceed to the inverse projection.

20 Claims, 7 Drawing Sheets

(56) References Cited

U.S. PATENT DOCUMENTS

| | | | |
|---|---|---|---|
| 2003/0198393 A1* | 10/2003 | Berstis | H04N 5/23206 |
| | | | 382/239 |
| 2011/0157229 A1 | 6/2011 | Ni et al. | |
| 2015/0279121 A1 | 10/2015 | Myers et al. | |
| 2017/0214943 A1 | 7/2017 | Cohen et al. | |
| 2018/0063505 A1* | 3/2018 | Lee | G06T 9/00 |
| 2019/0139266 A1* | 5/2019 | Budagavi | G06T 17/00 |

FOREIGN PATENT DOCUMENTS

| | | |
|---|---|---|
| CN | 102138334 A | 7/2011 |
| CN | 103047943 A | 4/2013 |
| CN | 103703758 A | 4/2014 |
| CN | 104715496 A | 6/2015 |
| CN | 105957106 A | 9/2016 |
| CN | 106331676 A | 1/2017 |
| CN | 106716490 A | 5/2017 |
| CN | 106940186 A | 7/2017 |
| CN | 107025673 A | 8/2017 |
| CN | 107079104 A | 8/2017 |
| EP | 2833323 A2 | 2/2015 |
| EP | 3249921 A1 | 11/2017 |

OTHER PUBLICATIONS

Ochotta et al., "Image-Based Surface Compression", Computer Graphics Forum, vol. 27, No. 6, Sep. 2008, 15 pages.

* cited by examiner

METHOD AND APPARATUS FOR ENCODING A POINT CLOUD REPRESENTING THREE-DIMENSIONAL OBJECTS

This application claims the benefit, under 35 U.S.C. § 365 of International Application PCT/EP2018/082954, filed Nov. 29, 2018, which was published in accordance with PCT Article 21(2) on Jun. 13, 2019, in English, and which claims the benefit of European Patent Application No. 17306705.9, filed Dec. 5, 2017.

TECHNICAL FIELD

The present disclosure relates to the domain of volumetric video content. The present disclosure is also understood in the context of the formatting of the data representative of the volumetric content, for example for an immersive rendering on end-user devices such as mobile devices or Head-Mounted Displays.

BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Immersive video, also called 360° flat video, allows the user to watch all around himself through rotations of his head around a still point of view. Rotations only allow a 3 Degrees of Freedom (3DoF) experience. Even if 3DoF video is sufficient for a first omnidirectional video experience, for example using a Head-Mounted Display device (HMD), 3DoF video may quickly become frustrating for the viewer who would expect more freedom, for example by experiencing parallax. In addition, 3DoF may also induce dizziness because of a user never only rotates his head but also translates his head in three directions, translations which are not reproduced in 3DoF video experiences.

Volumetric video (also known as 6 Degrees of Freedom (6DoF) video) is an alternative to 3DoF video. When watching a 6DoF video, in addition to rotations, the user can also translate his head inside the watched content and experience parallax. Such videos considerably increase the feeling of immersion and the perception of the scene depth but also prevent from dizziness by providing consistent visual feedback during head translations. The associated content is basically created by the means of dedicated sensors allowing the simultaneous recording of color and depth of the scene of interest. The use of rig of color cameras combined with photogrammetry techniques is a common way to do this recording.

While 3DoF videos comprise a sequence of images resulting from the un-mapping of texture images (e.g. spherical images encoded according to latitude/longitude projection or equirectangular projection), 6DoF video frames embed information from several points of views. They can be viewed as a temporal series of point clouds resulting from a three-dimension capture. Two kinds of volumetric videos may be considered depending on the viewing conditions. A first one (i.e. complete 6DoF) allows a complete free navigation inside the video content whereas a second one (aka. 3DoF+) restricts the user viewing space to a limited volume, allowing limited translation of the head and parallax experience. This second context is a natural compromise between free navigation and passive viewing conditions of a seated audience member.

Encoding point clouds in a sequence of frames (i.e. a video content) in a manner that is in line with standard video pipeline (e.g. MPEG), taking advantage of compression and transport standards, and that allows a decoding at a video frame rate (i.e. at least 24 images/point clouds per second) is a challenge. The present principles present methods, devices and stream to address these coding and decoding technical problems.

SUMMARY

References in the specification to "one embodiment", "an embodiment", "an example embodiment", "a particular embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present disclosure relates to a method of encoding a three-dimensional scene in a stream. The method comprises:
  generating a plurality of projection maps by:
    a. determining a part of the three-dimensional scene according to a solid angle centered on a point of view, this part of the 3D scene being visible from the point of view;
    b. projecting the part of the three-dimensional scene onto a projection map according to a projection mapping and adding this map to the plurality of projection maps; and
    c. removing this part of the three-dimensional scene from the scene; rotating the solid angle; and iterating a, b and c until the three-dimensional scene is empty;
  generating a plurality of pictures from the plurality of projection maps. a picture being a depth consistent cluster of connected pixels of a projection map;
  packing at least one picture of said plurality of pictures in an image and determining a data comprising for each picture:
    a location of this picture in the image, for example coordinates of the upper left corner of the bounding rectangle;
    an information relative to the solid angle used for the projection map of the picture, for example a 3D vector and an angle value or an identifier of a permutation of the axes of the frame of reference of the 3D space; and
    a description of a part of the three-dimensional space encompassing the part of the three-dimensional scene projected onto the picture, for example as angular ranges (i.e. a solid angle) and a depth range;
  encoding the image and the associated data in the stream.

The present disclosure also relates to a device adapted to encode a three-dimensional scene in a stream. The device comprises a memory associated with a processor configured to:
  generate a plurality of projection maps by:

a. determining a part of the three-dimensional scene according to a solid angle centered on a point of view, said part being visible from said point of view;
b. projecting said part of the three-dimensional scene onto a projection map of said plurality of projection maps according to a projection mapping; and
c. removing said part of the three-dimensional scene from the scene; rotating the solid angle; and iterating a, b and c until the three-dimensional scene is empty;

generate a plurality of pictures from said plurality of projection maps, a picture being a depth consistent cluster of connected pixels of a projection map;

pack at least one picture of said plurality of pictures in an image and determining a data comprising for each of said at least one picture:
 a location of said picture in said image,
 an information relative to the solid angle used for the projection map of said picture, and
 a description of a part of the three-dimensional space encompassing part of the three-dimensional scene projected onto said picture;

encode said image and said data in said stream.

According to a particular characteristic, rotating the solid angle is performed by permuting the axis order of a reference frame of the three-dimensional space. The information relative to the solid angle is an identifier of this permutation.

According to a particular characteristic, the projection mapping is an equirectangular projection mapping.

According to a particular characteristic, points of the 3D scene comprise a color attribute and two images are generated and encoded in the stream with the associated data. One image packs at least one picture with a depth attribute and the other image packs at least one picture with a color attribute.

According to a particular characteristic, the data associated with packed pictures comprise an information indicating whether a picture has been rotated during the packing in the image.

The present disclosure also relates to a method of retrieving a three-dimensional scene from a stream. The method comprises:

decoding from the stream at least one picture packed in an image and a data comprising, for each of said at least one picture:
 a location of said picture in the image,
 an information relative to a solid angle, and
 a description of a part of the three-dimensional space;
retrieving the three-dimensional scene by inverse projecting pixels of pictures according to a projection mapping using said information relative to a solid angle and the description of a part of the three-dimensional space.

The present disclosure also relates to a device adapted for retrieving a three-dimensional scene from a stream. The device comprises a memory associated with a processor configured to:

decode from the stream at least one picture packed in an image and a data comprising, for each of said at least one picture:
 a location of said picture in said image,
 an information relative to a solid angle, and
 a description of a part of the three-dimensional space;
retrieve said three-dimensional scene by inverse projecting pixels of said at least one picture according to a projection mapping using said information relative to a solid angle and said description of a part of the three-dimensional space.

According to a particular characteristic, information relative to the solid angle is an identifier of a permutation of the axis order of a reference frame of the three-dimensional space and the projection mapping uses the permutation.

According to a particular characteristic, the projection mapping is an equirectangular projection mapping.

According to a particular characteristic, two images are decoded with said data associated with packed pictures. One image is packing at least one picture with a depth attribute and the other image is packing at least one picture with a color attribute.

According to a particular characteristic, data associated with images in which pictures are packed comprise an information indication whether a picture has been rotated during the packing in the image, the projection mapping using this information to inverse projecting pixels of said picture.

The present disclosure also relates to a stream carrying data representative of at least a 3D scene. The stream comprises at least one image. Images comprise a set of packed pictures called patches. The stream also comprises data comprising a patch data item list. A patch data item is associated with a picture of an image and comprises:
 a location of this picture in this image,
 an information relative to a solid angle, and
 a description of a part of the three-dimensional space.

LIST OF FIGURES

The present disclosure will be better understood, and other specific features and advantages will emerge upon reading the following description, the description making reference to the annexed drawings wherein.

DETAILED DESCRIPTION OF EMBODIMENTS

Figure 1:
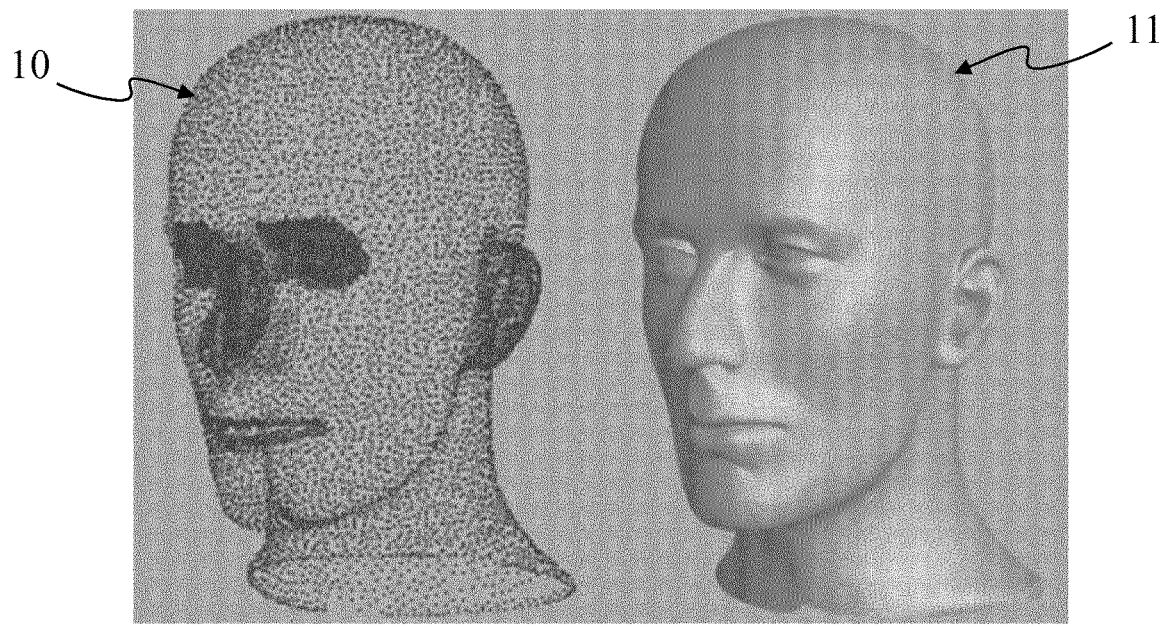
FIG. 1 shows a point cloud and a surface built over the point cloud, according to a non-restrictive embodiment of the present principles.

The subject matter is now described with reference to the drawings, wherein like reference numerals are used to refer to like elements throughout. In the following description, for purposes of explanation, numerous specific details are set forth in order to provide a thorough understanding of the subject matter. It can be evident, however, that subject matter embodiments can be practiced without these specific details.

The present description illustrates the principles of the present disclosure. It will thus be appreciated that those skilled in the art will be able to devise various arrangements that, although not explicitly described or shown herein, embody the principles of the disclosure.

The present principles will be described in reference to a particular embodiment of a method of encoding a three-dimensional (3D) scene in a stream. Points of the 3D scene are iteratively projected on projection maps. Depth and optionally color of projected points are encoded in pixels of the projection maps. Only a part of the 3D scene is projected at each iteration of the process. The part to be projected is determined according to a solid angle centered on a point of view. Points of the 3D scene belonging to the part of the 3D space defined by the solid angle and visible from the point of view are projected onto a projection map according to a projection mapping function. This selection of the part of the 3D scene to be projected has the advantage to limit the distortion of the image of the 3D scene on the projection map, allowing the generating of compact pictures at the packing step of the present principles.

FIG. 1 shows a point cloud 10 and a surface 11 built over the point cloud. The point cloud 10 corresponds to a large collection of points representing the external surface or the external shape of an object or a group of objects. A point cloud may be seen as a vector based structure, wherein each point has its coordinates. For instance, a vector may be defined by three-dimensional coordinates XYZ in a frame of reference centered on an origin point. In another example, vectors are defined by radial coordinates (θ,φ,d) where (θ,φ) represents a three-dimension direction relative to a point of view and d the distance (also called 'depth') between the point of view and the point. A point may also have a color component that may be expressed in any color space, for example RGB (Red, Green and Blue) or YUV (Y being the luma component and UV two chrominance components). A surface 11 may be defined from the point cloud. The surface may be obtained according to several methods. For instance, points may be "splatted". These splats are represented as disks whose components (e.g. color) vary diametrically in normal (e.g. Gaussian) manner. Flat disks form a surface that is smoothed. In a variant, a triangulation may be performed on the points and the surface defined by a smoothed mesh based on the triangulation. The surface 11 may be computed by a graphic processor. It is used to determine visibility of points from a point of view. In the example of FIG. 1, for example, some points of the neck behind the chin, visible on the point cloud representation 10 are not visible on the surface representation 11 because the surface fills the space gap between points. With a surface representation, it is possible to determine whether a point of the point cloud is visible or not from a point of view.

Model 11 may be a 3D mesh representation and points of point cloud 10 may be the vertices of the mesh. Points 10 may also points spread on the surface of faces of the mesh. Model 11 may also be represented as a splatted version of point of cloud 10; the surface of model 11 being created by splatting the point of point of cloud 10. Model 11 may be represented by a lot of different representations such as voxels or splines. FIG. 1 illustrates the fact that it is always possible to define a point cloud from a surface representation of a 3D object and reciprocally it is always possible to create a surface representation of a 3D object from a point of cloud. As used herein, projecting points of a 3D object (by extension points of a 3D scene) onto a projection map is equivalent to projecting any representation of this 3D object onto a projection map.

Figure 2:
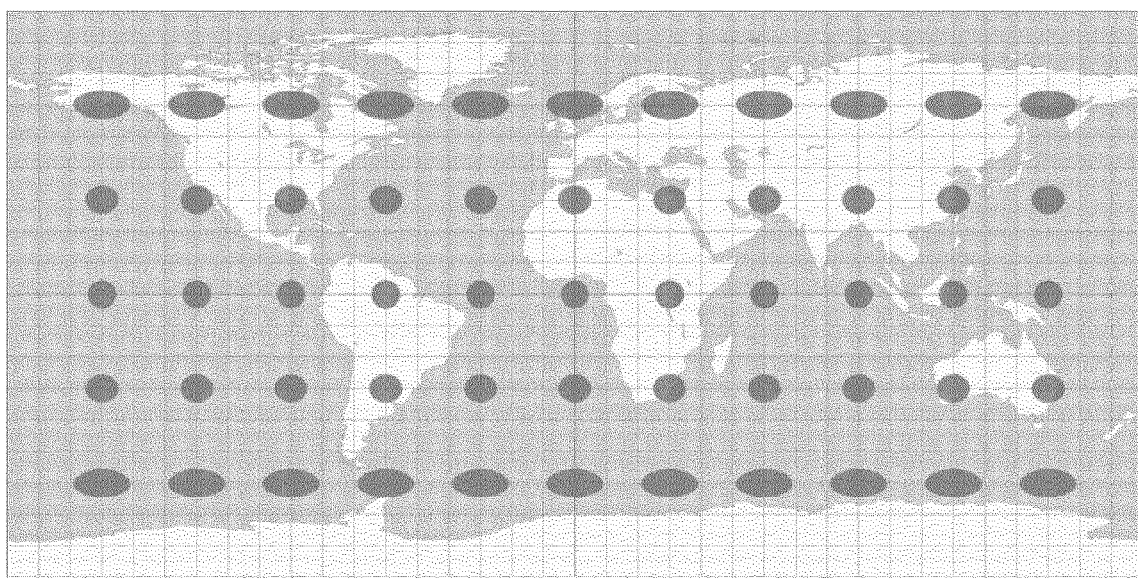
FIG. 2 shows a map of the Earth projected according to the equirectangular projection mapping from a point of view located at the center of the Earth sphere, according to a non-restrictive embodiment of the present principles.

FIG. 2 shows a map of the Earth projected according to the equirectangular projection mapping from a point of view located at the center of the Earth sphere. Such a projection may involve high distortions especially around the pole areas. When points of the 3D scene are projected on these areas, typically parts above or below the point of view, the corresponding image of these points is bigger than it would have been, if these points were projected at the equatorial part. As a consequence, encoding 3D objects projected at the pole areas require more pixels than encoding the same 3D objects projected at the equatorial area as illustrated by the ellipse spread over FIG. 2. Each ellipse corresponds to the projection a same sphere. The shape of the projection varies according to the area of the projection map the sphere is projected onto. This area depends on the location of the 3D object in the 3D space and on the projection mapping used for the projection. FIG. 2 shows that more pixels are required to encode the projection of the sphere if it projected on the pole areas than the projection of the same sphere at the equatorial area. This phenomenon is particularly true for spherical projection mapping like equirectangular projection mapping illustrated in FIG. 2. The phenomenon exists to a lesser extent for other projection mappings centered on a point of view, for example, cube mapping or pyramidal mapping.

According to the present principles, a part of the 3D space is determined in a way that, points belonging to said part of the 3D space are projected onto low-distortion areas of the projection map according to the projection mapping (e.g. for the equirectangular projection mapping or for a cubical projection mapping, points projected onto the equatorial area). Such a selection has the advantage to minimize the distortion of the projected image and to minimize the number of pixels required to encode the projected points.

Figure 3:
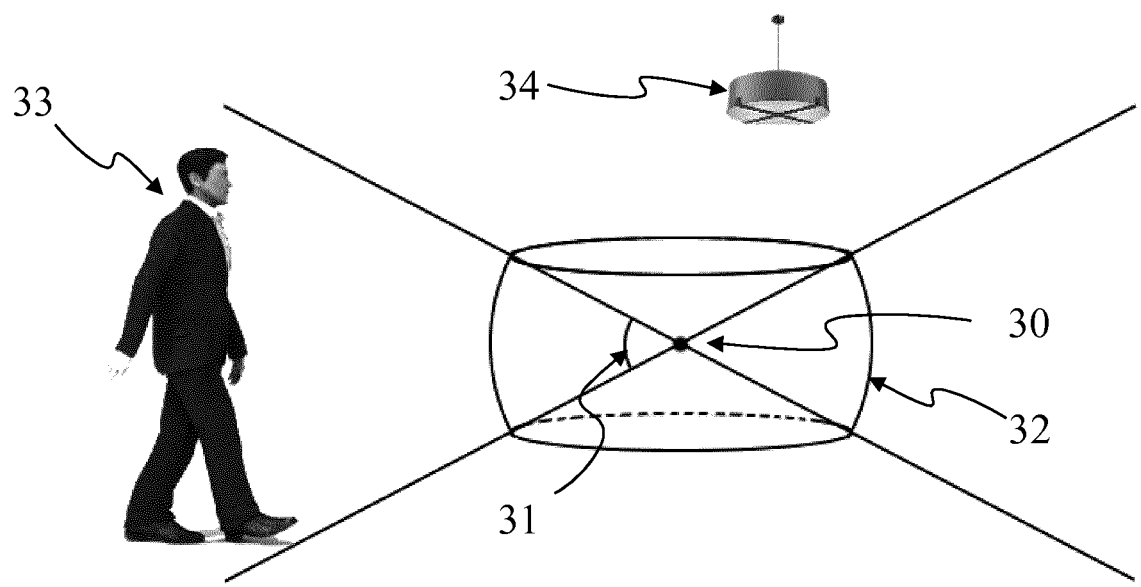
FIG. 3 illustrates a first determining of a part of the 3D scene according to a solid angle centered on a point of view. In the example of FIG. 3, the 3D scene comprises a walking man and a ceiling light, according to a non-restrictive embodiment of the present principles.
Figure 4:
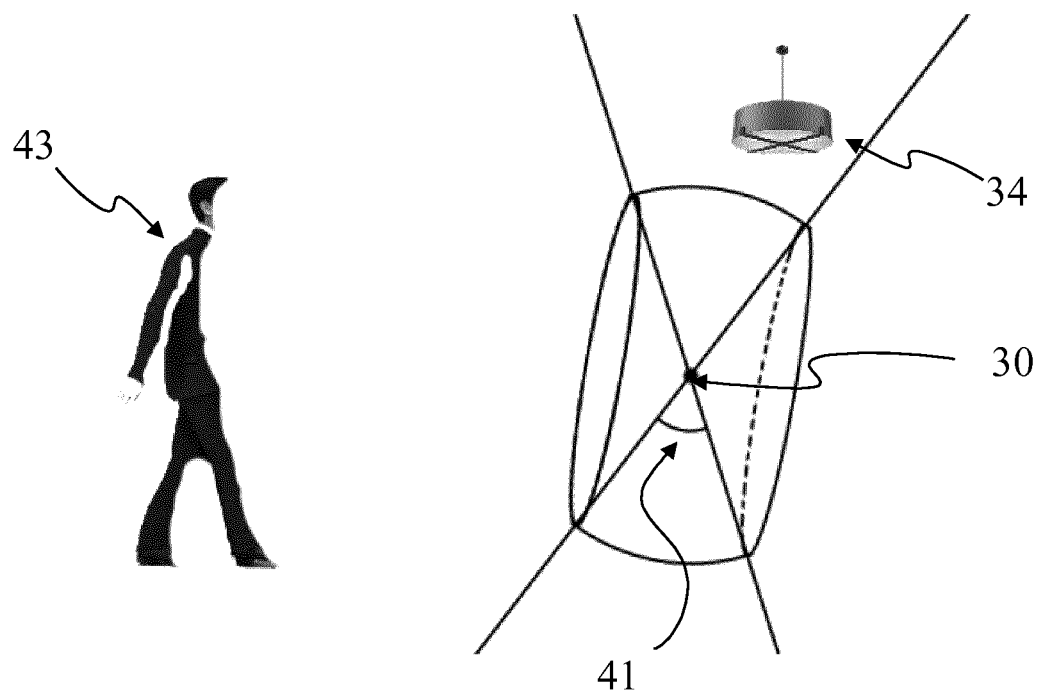
FIG. 4 illustrates a second determining of a part of the residual 3D scene according to a solid angle centered on the point of view of FIG. 3, according to a non-restrictive embodiment of the present principles.
Figure 5:
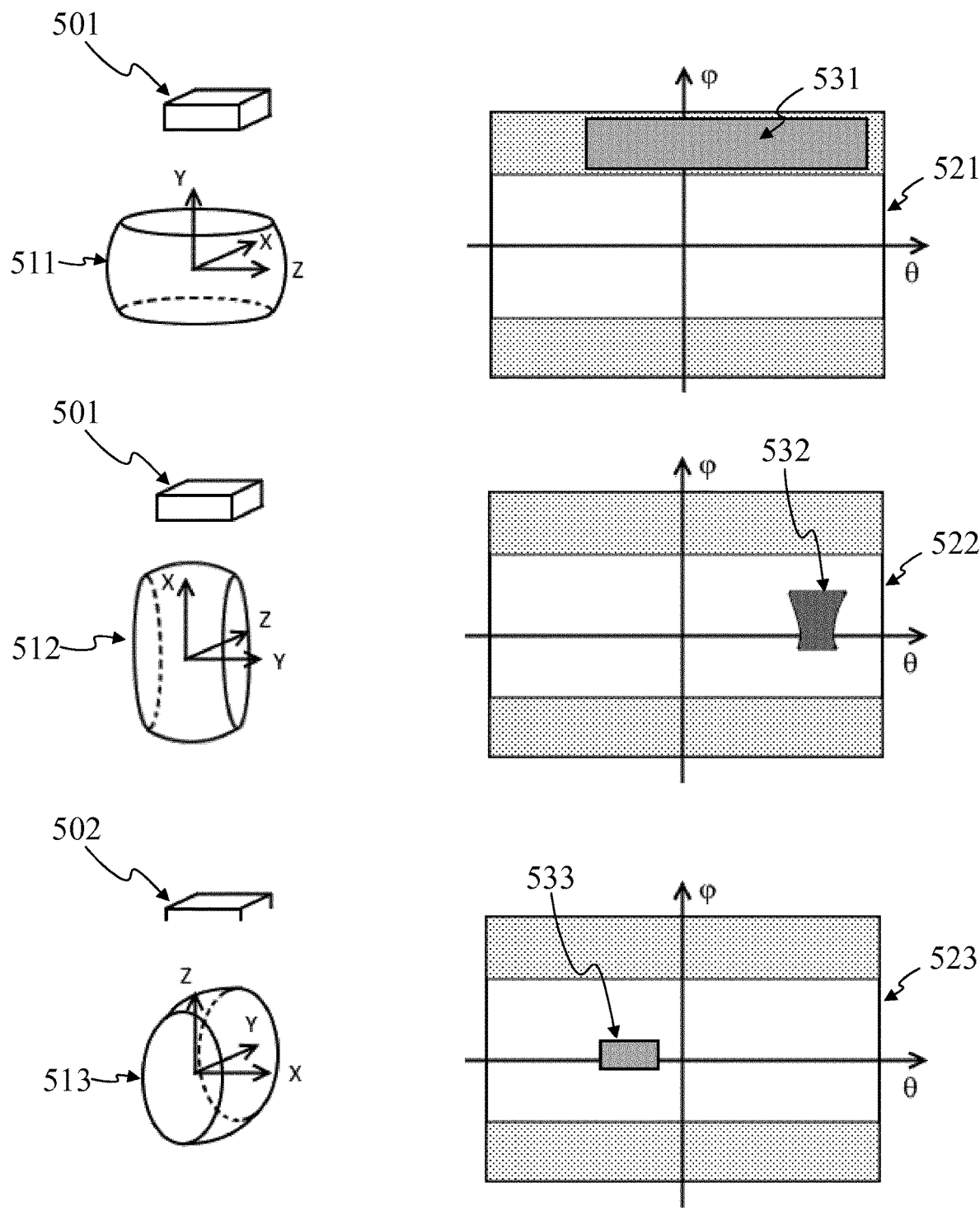
FIG. 5 illustrates three iterations of the projection step of a method for encoding a 3D scene in a data stream, according to the present principles.

FIG. 3 illustrates a first determining of a part of the 3D scene according to a solid angle centered on a point of view. In the example of FIG. 3, the 3D scene comprises a walking man 33 and a ceiling light 34. A point of view 30 is determined for the encoding of the 3D scene. A corresponding point of view will be used for the decoding of the 3D scene according to the type of immersive video rendering that the immersive rendering device is capable of (3DoF, 3DoF+ or 6Dof). A solid angle 31 is obtained to determine a part of the 3D space compliant with the present principles. For illustration and for the sake of clarity, this solid angle 31 is represented in FIGS. 3 to 5 as a spherical ring 32, also called truncated sphere. According to the selected projection mapping a surface 32 is determined. In the example of FIG. 3, according to a selected equirectangular projection mapping, the surface 32 is a spherical ring. The part of the 3D scene belonging to the part of the 3D space determined according to the solid angle 31 centered on the point of view 30 is selected to be projected onto the projection surface 32 to generate a projection map. In the example of FIG. 3, object 33 (i.e. the walking man) belongs to the selected part of the 3D scene; the ceiling light 34 does not. Only points of the selected part of the 3D scene, visible from the point of view 30 are projected to generate a projection map. Projected points are then removed from the 3D scene in order not to be projected a second time onto a different projection map and to make visible points which were not visible from point of view 30 before their removal. In the example of FIG. 3, a front part of the walking man 33 is removed from the 3D scene. Points of the back of the man are then visible from point of view 30 and may be projected onto another projection map. The projection map generated during this iteration is added to a set of projection maps.

FIG. 4 illustrates a second determining of a part of the residual 3D scene according to a solid angle centered on the point of view of FIG. 3. The residual 3D scene comprises the points of the original 3D scene that have not been projected at a previous iteration of the present principles. In the example of FIG. 4, the residual 3D scene comprises ceiling light 34 and the residual part 43 of walking man 33 of FIG. 3. According to the present principles, a solid angle 41 centered on point of view 30 is determined as being a rotation of solid angle 31 of the previous iteration. Solid angle 41 may be of a different value than solid angle 31 (i.e. wider or narrower) or may be of the same value. Solid angle 41 is determined to define a new part of the 3D space that encompass a part of the residual 3D scene that has not yet been projected, that is comprising points. In the example of FIG. 4, solid angle 41 is obtain by rotating solid angle 31 in a way to select ceiling light 34 to be projected. In a variant, solid angle 41 of an iteration is centered on a point of view different from the point of view of the previous iteration.

At this iteration of the present principles, points of the 3D scene that belong to the part of the 3D space defined according to the rotated solid angle centered on the point of view and that are visible from this point of view are projected onto a projection map according to a projection mapping. The generated projection map is added to the set of projection maps. Each projection map added in the set (also called list) of projection maps is associated with an information relative to the solid angle used to generate the projection map. A solid angle is described according to the frame of reference of the 3D space, for example with a normalized 3D vector and an angle value in degrees or in radians. This information will be integrated in patch data items of pictures clustered from this projection map at a further step of the present principles.

FIG. 5 illustrates three iterations of the projection step of a method for encoding a 3D scene in a data stream, according to the present principles. An object 501 is located within the 3D space defined by an orthogonal frame of reference centered on an origin point. The point of view is set at the origin point of the frame of reference. According to the present principle, a solid angle 511 is determined. In the example of FIG. 5, this first solid angle is set in the (X, Z) plane (i.e. around the Y axis) with a value of 60° (sixty degrees) or 75° for example. The solid angle may be of any value. Setting solid angles to a value greater than 60° allows to embrace the entirety of the 3D space in two of the three iterations of the example of FIG. 5. For instance, the obtained or selected projection mapping is the equirectangular projection mapping (ERP). According to the present principles, points of the 3D scene visible from the point of view are projected onto a frame 521 according to the obtained or selected projection mapping. In the example of FIG. 5, visible points of object 501 would be projected onto the area 531 of frame 521. As solid angle 511 limits the considered part of the 3D space, only the white part of frame 521 is available for storing projected points and area 531 is out of the available part. Therefore, this first iteration generates an empty projection map. As being empty, this first projection map may be discarded. In a second step, solid angle is rotated to become solid angle 512. According to the variant illustrated in FIG. 5, the solid angle is not rotated but axes of the frame of reference are permutated a first time, leading to a rotation to the solid angle. A new iteration of the present principles is performed, generating a new projection map 522. Projection map 522 is associated with an information relative to the solid angle used for this iteration. In the variant illustrated by FIG. 5, this information may be reduced to an identifier of the permutation of the axes. For instance, the first iteration may be associated with a first identifier 0, the second with 1 and the third with 2. As these three iterations are looped, the same three solid angles are repetitively used. Points of object 501, belonging to the part of the 3D space defined by solid angle 512 and visible from the point of view are projected onto said projection map 522 as are 532. Area 532 is a distorted rectangle due to the ERP mapping. Projection map 522 is added to the list of projection maps that will be used in the next step of the present principles to determine pictures, a picture being a depth consistent cluster of connected pixels of a projection map. Points of object 501 projected onto projection map 522 are removed from the 3D scene and residual object 502 is set as a part of the residual 3D scene. In a third step, solid angle 512 is rotated by the means of an axis permutation according to the principles of the variant illustrated in FIG. 5. A third iteration is then performed. Residual points of the 3D scene (consisting in residual points of object 502 in the example of FIG. 5) are projected onto projection map 523 as they belong to the space defined by solid angle 513 and are visible from the point of view. This projection results in an area 533. Projection map 523, because it is not empty, is added to the list of projection maps used as input to the next step of the present principles.

Figure 6:
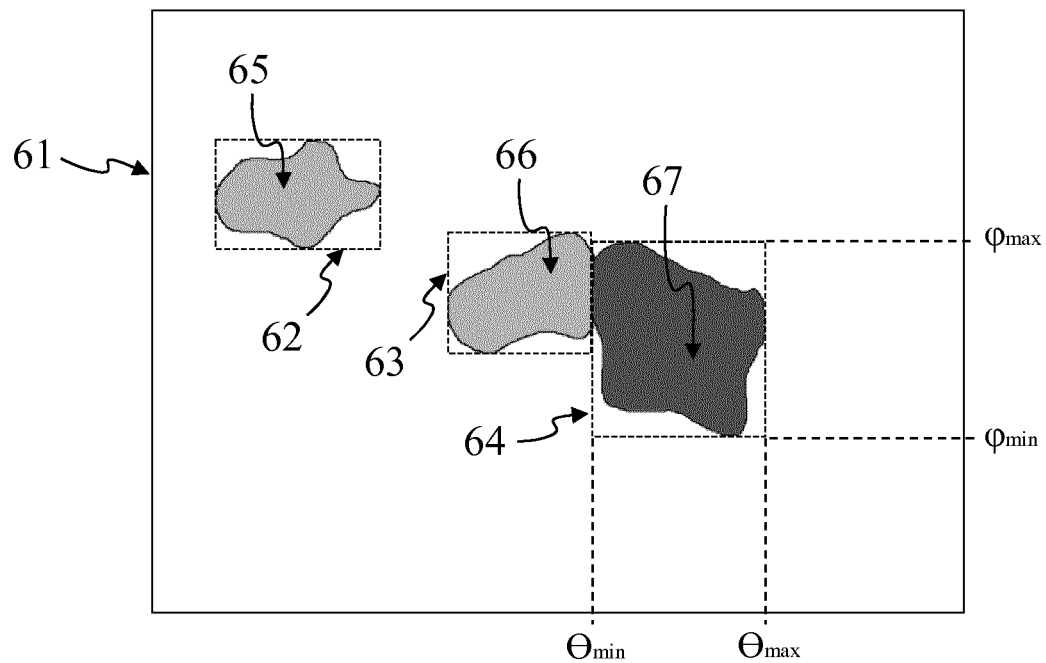
FIG. 6 shows a diagrammatical example of the generation of depth consistent pictures, called patches, from a projection map of the list of projection maps generated in accordance to the pealing process illustrated, for example in FIG. 5, according to a non-restrictive embodiment of the present principles.

FIG. 6 shows a diagrammatical example of the generation of depth consistent pictures, called patches, from a projection map 61 of the list of projection maps generated in accordance to the peeling process illustrated, for example in FIG. 5. Projection map 61 comprises pixels of area 65 corresponding to a first object (or part of a first object), pixels of area 66 storing depth information relative to visible points of a second object; and pixels of area 67 storing depth information relative to visible points of a third object; which may, for example, being a separate part of the second object. A pixel clustering operation is performed to cluster adjacent pixels of projection map 61 according to depth information. Pixels 65 constitute a cluster of adjacent pixels which may be delimited by a rectangle 62. Pixels 66 and 67 constitute an adjacent area of projection map 61. Pixels of area 66 and area 67 however differ on the depth value they store. Pixels 66 have a depth value notably smaller than the depth value of pixels 67. According to the present principles of the encoding method, clusters are determined according to their connection and their depth value. As there is a gap between the depth of pixels 66 and the depth of pixels 67, they are grouped in separate clusters. These two clusters may be represented as rectangles 63 and 64. High frequency area between the two areas may be absorbed by the clustering operation and rectangles 63 ad 64 may overlap. Data representative of rectangle areas defined by the clustering operation are stored in memory as patch data items. A patch data item comprises the information relative to the solid angle associated with the current projection map. For example, patch data for rectangle 64 comprise the angular range ([θmin, θmax],[φmin, φmax]) of the visible points of the third object according to the center of projection; θmin being the leftmost value of radial coordinates of points of the patch according to the center of projection, θmax being the rightmost, φmin being the downmost and φmax being the upmost. The depth range [ρmin,ρmax] of the pixel area is also registered in the patch data, where ρmin is the depth of the point which is the closest to the center of projection 40 and is the depth of the point which is the furthest from the center of projection. This component of patch data items is useful at the encoding step to increase dynamics of the byte range reserved for depth encoding. In a variant, clustering operation provide ellipsoid areas and patch data items comprise data representative of an ellipsoid area. Patch data items are added to a list of patch data items. The advantage of storing information about the area that the patch occupies in terms of angles is that this information is independent of the resolution of the projection map and of the resolution of the image in which the patch will be packed.

Figure 7:
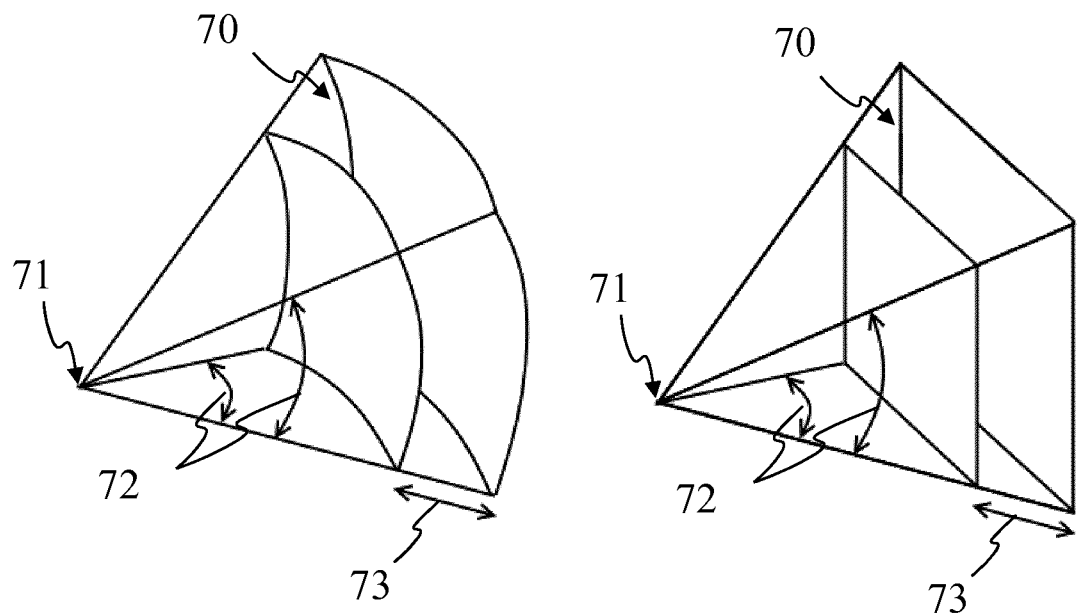
FIG. 7 shows a region of the 3D space encompassing points of the 3D scene projected onto a patch and as described in a patch data item according to a spherical projection on the left and according to a cubical projection on the right, according to a non-restrictive embodiment of the present principles.

FIG. 7 shows a region of the 3D space encompassing points of the 3D scene projected onto a patch and as described in a patch data item according to a spherical projection on the left and according to a cubical projection on the right. On the left of FIG. 7, according to a spherical projection method, each patch data item comprises data corresponding to a region of the 3D space 70 delimited by two portions of concentric spheres centered on the center of projection 71. The region is characterized by: first, an angular range 72, defined by [θmin, θmax] belonging to [-π; π] radians and [φmin, φmax] belonging to [-π/2; π/2] radians and, second, a depth range 73 [ρmin, ρmax]. Same description is used for a cubical projection method on the right of FIG. 7. The region of the space 70 delimited by a truncated four-sided pyramid pointing to the center of projection 71 and characterized by angular range 72 and depth range 73. Such projection methods (e.g. an equirectangular projection) are only angle-dependent. A big object far from the center of projection may take the same area in the projection map than a small close object. According to the present principles, it is so possible to adapt the patch size according to the importance of the object from the center of projection and not according to the intrinsic size of projected object. Such a property is in line with a 3DoF+ context.

Figure 8:
FIG. 8 shows an image comprising pictures (also called patches) encoding depth information of a 3D scene, according to a non-restrictive embodiment of the present principles.

FIG. 8 shows an image comprising pictures (also called patches) encoding depth information of a 3D scene. In this example, the peeling operation has been performed on points of the 3D scene. A list of pictures and associated patch data items has been determined according to the present principles. Patches have a resolution called "Atlas Resolution" which defines the quality of the encoding. For example, an atlas resolution from 18 to 25 pixels per degree allows the encoding of complex scene in a 2048×2048 pixels picture containing a large number of patches (e.g. 500 or 600 patches). The lower this resolution is, the worse the final quality. To ensure a good alignment of the picture patches on the grid of the image, the projection maps resolution may be chosen as an integral divider of the atlas resolution.

A packing operation of patches is performed. Numerous heuristic algorithms exist to solve the NP-complete problem of packing rectangular cells into a rectangular bin (i.e. the image to be generated), as the algorithm described in "A Thousand Ways to Pack the Bin" by Jukka Jylänki for instance or the "MaxRects" algorithm (i.e. Single Bin Best Short Side First configuration) which provides good filling ratio at quite low computational costs. At the end of the packing operation, a location (x, y) of the patch in the image (e.g. lower left corner position), and, according to the packing algorithm, a boolean value indicating whether the patch has been rotated are assigned to each patch of the patch data item list. The packing may be optimized by aligning the patches on Coding Units of the video encoder in order to improve the decoding stage. FIG. 8 shows a picture in which are packed patches of the list of patch data items determined for a 360° 3D scene. Pixels of the image of FIG. 8 comprise depth information (i.e. the distance between points of the point cloud and the center of projection).

Figure 9:
FIG. 9 shows an image comprising color patches of the list of patch data items determined for the 3D scene of FIG. 8 according to a non-restrictive embodiment of the present principles.

FIG. 9 shows an image comprising color patches of the list of patch data items determined for the 3D scene of FIG. 8 according to a non-restrictive embodiment of the present principles. In an embodiment, depth and color information are encoded in pixels of a unique picture. In another embodiment, depth and color information are encoded in two pictures.

According to the present principles, a 3D scene of the sequence of 3D scenes is encoded as an image comprising packed patches associated with data representative of a list of patch data items. The encoding of a 3D scene as an image associated with data has the advantage to be in line with standard compression and transport video pipelines. It is usual, for compression reasons, to gather series of pictures in Group of Pictures (GoP). According to an embodiment of the present encoding method, successive point clouds of the sequence of point clouds to encode are gathered together as a unique point cloud. This grouped 3D scenes goes through the peeling operation and the packing operation. A unique list of patch data items is determined for every 3D scene of the group. The packing structure of the picture is computed for the whole GoP. This structure is preserved during one group of pictures as it notably reduces the video encoding bitrate, especially when the encoder is setup to disable open-gop optimization. Color and depth pictures comprise the results of the splatted projection of each point on image patches. Pictures of the group of pictures and data representative of the list of patch data items are encoded in the stream.

Figure 10:
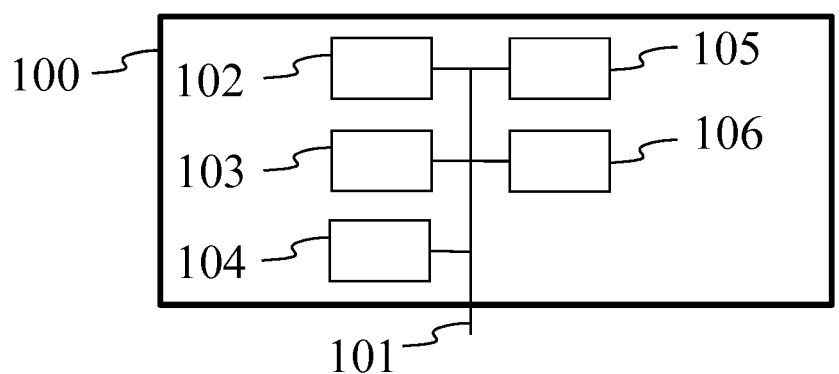
FIG. 10 shows an example architecture of a device which may be configured to implement a method described in relation with FIGS. 12 and/or 13, according to a non-restrictive embodiment of the present principles.
Figure 12:
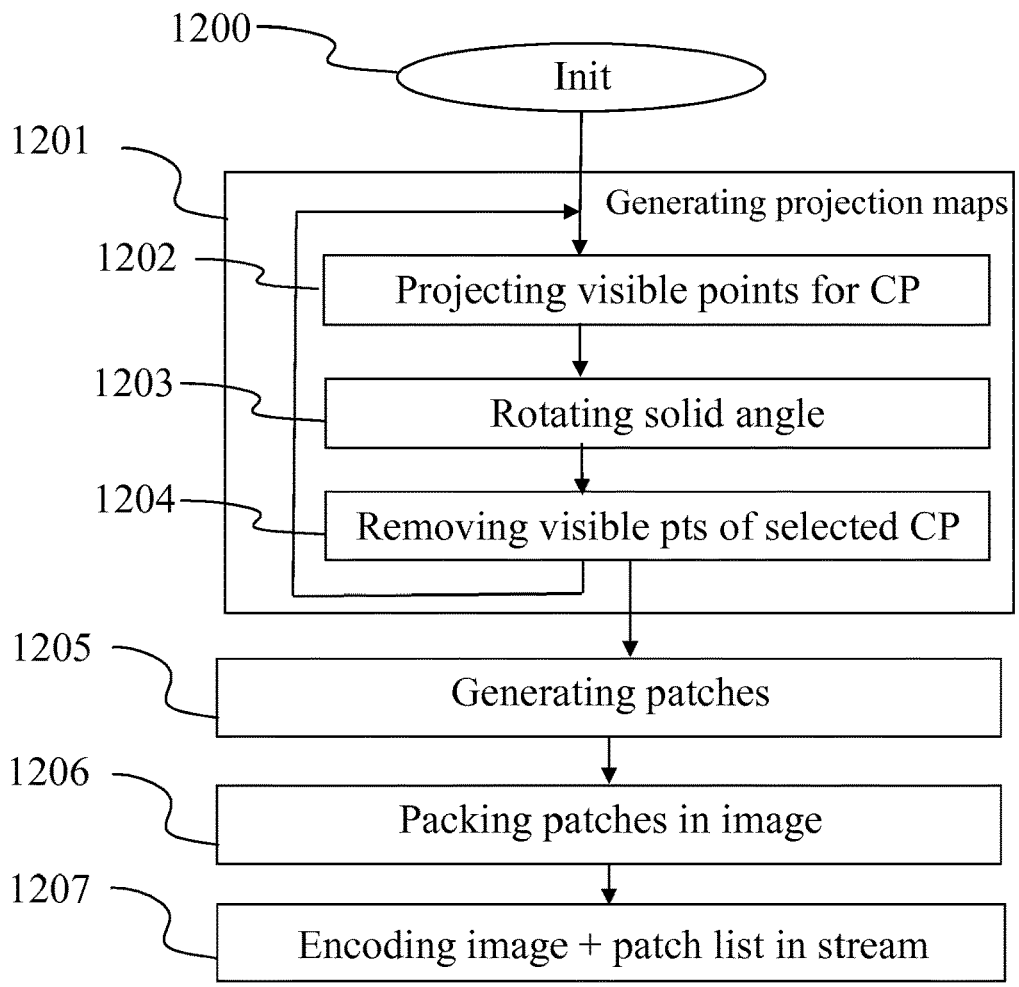
FIG. 12 illustrates a method for encoding a point cloud in a stream, in a device 100 described with regard to FIG. 10 and configured to be an encoder, according to a non-restrictive embodiment of the present principles.

FIG. 10 shows an example architecture of a device 100 which may be configured to implement a method described in relation with FIGS. 12 and/or 13. The device 100 may be configured to be an encoder, a decoder and/or a renderer.

The device 100 comprises following elements that are linked together by a data and address bus 101:
- a microprocessor 102 (or CPU), which is, for example, a DSP (or Digital Signal Processor);
- a ROM (or Read Only Memory) 103;
- a RAM (or Random Access Memory) 104;
- a storage interface 105;
- an I/O interface 106 for reception of data to transmit, from an application; and
- a power supply, e.g. a battery.

In accordance with an example, the power supply is external to the device. In each of mentioned memory, the word <<register>> used in the specification may correspond to area of small capacity (some bits) or to very large area (e.g. a whole program or large amount of received or decoded data). The ROM 103 comprises at least a program and parameters. The ROM 103 may store algorithms and instructions to perform techniques in accordance with present principles. When switched on, the CPU 102 uploads the program in the RAM and executes the corresponding instructions.

The RAM 104 comprises, in a register, the program executed by the CPU 102 and uploaded after switch-on of the device 10, input data in a register, intermediate data in different states of the method in a register, and other variables used for the execution of the method in a register.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with an example of encoding or an encoder, the sequence of 3D scenes is obtained from a source. For example, the source belongs to a set comprising:
- a local memory (103 or 104), e.g. a video memory or a RAM (or Random Access Memory), a flash memory, a ROM (or Read Only Memory), a hard disk;
- a storage interface (105), e.g. an interface with a mass storage, a RAM, a flash memory, a ROM, an optical disc or a magnetic support;
- a communication interface (106), e.g. a wireline interface (for example a bus interface, a wide area network interface, a local area network interface) or a wireless interface (such as a IEEE 802.11 interface or a Bluetooth® interface); and
- a user interface such as a Graphical User Interface enabling a user to input data.

In accordance with examples of the decoding or decoder(s) 33 of FIG. 3, the stream is sent to a destination; specifically, the destination belongs to a set comprising:
- a local memory (103 or 104), e.g. a video memory or a RAM, a flash memory, a hard disk;
- a storage interface (105), e.g. an interface with a mass storage, a RAM, a flash memory, a ROM, an optical disc or a magnetic support; and
- a communication interface (106), e.g. a wireline interface (for example a bus interface (e.g. USB (or Universal Serial Bus)), a wide area network interface, a local area network interface, a HDMI (High Definition Multimedia Interface) interface) or a wireless interface (such as a IEEE 802.11 interface, WiFi® or a Bluetooth® interface).

In accordance with examples of encoding or encoder, a bitstream comprising data representative of the volumetric scene is sent to a destination. As an example, the bitstream is stored in a local or remote memory, e.g. a video memory (104) or a RAM (104), a hard disk (103). In a variant, the bitstream is sent to a storage interface (105), e.g. an interface with a mass storage, a flash memory, ROM, an optical disc or a magnetic support and/or transmitted over a communication interface (106), e.g. an interface to a point to point link, a communication bus, a point to multipoint link or a broadcast network.

In accordance with examples of decoding or decoder or renderer, the bitstream is obtained from a source. Exemplarily, the bitstream is read from a local memory, e.g. a video memory (104), a RAM (104), a ROM (103), a flash memory (103) or a hard disk (103). In a variant, the bitstream is received from a storage interface (105), e.g. an interface with a mass storage, a RAM, a ROM, a flash memory, an optical disc or a magnetic support and/or received from a communication interface (105), e.g. an interface to a point to point link, a bus, a point to multipoint link or a broadcast network.

In accordance with examples, the device 100 is configured to implement a method described in relation with FIG. 12, and belongs to a set comprising:
- a mobile device;
- a communication device;
- a game device;
- a tablet (or tablet computer);
- a laptop;
- a still picture camera;
- a video camera;
- an encoding chip;
- a server (e.g. a broadcast server, a video-on-demand server or a web server).

Figure 13:
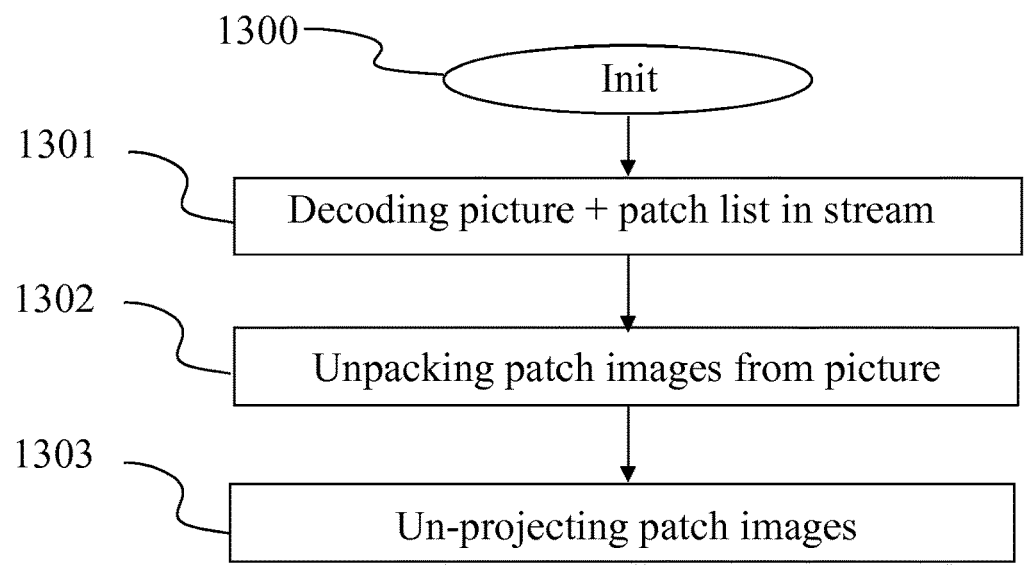
FIG. 13 illustrates a method for decoding a 3D scene from a stream, in a device 100 described with regard to FIG. 10 and configured to be a decoder, according to a non-restrictive embodiment of the present principles.

In accordance with examples, the device 100 is configured to implement a rendering method described in relation with FIG. 13, and belongs to a set comprising:
- a mobile device;
- a communication device;
- a game device;
- a set top box;
- a TV set;
- a tablet (or tablet computer);
- a laptop; and
- a display (such as a HMD for example).

Figure 11:
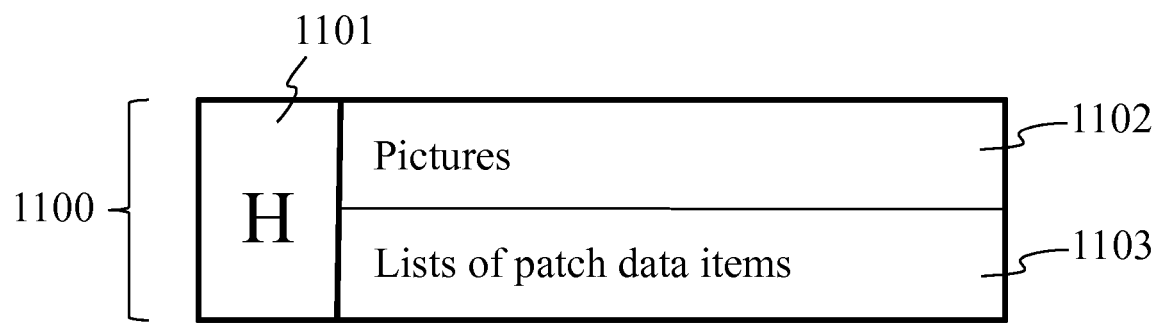
FIG. 11 shows an example of an embodiment of the syntax of a stream when the data are transmitted over a packet-based transmission protocol, according to a non-restrictive embodiment of the present principles.

FIG. 11 shows an example of an embodiment of the syntax of a stream when the data are transmitted over a packet-based transmission protocol. FIG. 11 shows an example structure 1100 of a volumetric video stream. The structure consists in a container which organizes the stream in independent syntax elements. The structure may comprise a header part 1101 which is a set of data common to every syntax elements of the stream. For example, the header part comprises metadata about syntax elements, describing the nature and the role of each of them. The header part may also comprise the coordinates of the centers of projection used for the encoding and information about the size and the resolution of pictures. The structure comprises a payload comprising syntax elements 1102 and 1103. The first syntax element 1102 comprises data representative of images comprising packed patches. Images may have been compressed according to a video compression method. An image is associated with a list of patch data items of the second syntax element 1103. In an embodiment, the first syntax element comprises a sequence of pairs of images, one image encoding depth information, the paired image encoding color information. The second syntax element comprises data representative of the list of patch data items associated with images of the first syntax element 1102. A list of patch data items may be associated with a group of images. A patch data item comprises a location of the associated picture (i.e. patch) in the image, an information relative to the solid angle used for the projection map of the picture, and a description of the part of the three-dimensional space encompassing part of the three-dimensional scene projected onto the picture as described in relation with FIG. 7. A patch data item comprises at least a location of the associated patch with the image (e.g. the upper left corner coordinates), an information relative to the solid angle used for generating the projection map that the patch has been extracted from (e.g. a 3D vector and an angle value or an identifier of a permutation of axes of the frame of reference of the 3D space) and a description of the part of the space that points of the 3D scene projected onto this patch belong to (e.g. angle and depth ranges as described in relation with FIGS. 6 and 7).

For illustration purpose, in the context of ISOBMFF file format standard, color map, depth map and the metadata would typically be referenced in ISOBMFF tracks in a box of type MOOV, with color map and depth map data themselves embedded in media-data box of type mdat.

FIG. 12 illustrates a method for encoding a point cloud in a stream, in a device 100 (described with regard to FIG. 10) configured to be an encoder, according to a non-restrictive embodiment of the present principles.

In a step 1200, the different parameters of device 100 are updated. In particular, the sequence of 3D scenes is obtained from a source, a solid angle is determined in a frame of reference of the 3D space of the 3D scenes, a projection method is initialized, sizes and resolutions of projection maps and pictures are determined, and an empty list of patch data items is created.

A list of projection maps generation step 1201 is performed. This operation is an iterative process comprising steps 1202, 1203 and 1204. In step 1202, points of the 3D scene which belong to the part of the space defined by the solid angle and which are visible from the center of projection are projected according to the projection method onto a projection map. This projection map is added to the list of projection maps. The resolution of the projection map is low (e.g. 1 pixel per degree or 2 pixels per degree) in order to prevent the clustering step 1205 from generating too little clusters and thus produce an excessive number of patch data items. In a variant, step 1205 may be performed each time a projection map is generated. In step 1203, adjacent pixels of the projection map are clustered according depth information. Patch data items associated with the clustered patch are added to the list of patch data items under construction. Iterations are performed until the point cloud is empty. In a variant, the operation 1201 is iterated until the list of patch data items is full. The list of patch data items is considered as full when the area needed for encoding image patches of the patch data items of the list is bigger than the area of the bin (i.e. the picture in which image patches will be arranged in operation 1205).

Once the list of patch data items is determined, a packing operation 1205 is performed resulting in the generation of the picture. Points of the point cloud are projected in image patches, image patches having the same resolution than the picture. Image patches are arranged in an optimized manner in the picture.

In a step 1206, the picture and associated list of patch data items are encoded in the stream according to the syntax described in relation to FIG. 11. The encoding method may be repeated for other point clouds of a sequence of point clouds. In an embodiment of the present principles, a group of point clouds of the sequence, gathered as a unique point cloud, is used as the entry point cloud of the encoding method. A list of patch data items common to pictures of the generated group of pictures is determined and encoded once in the stream in association with the whole group of pictures.

FIG. 13 illustrates a method for decoding a 3D scene from a stream, in a device 100 (described with regard to FIG. 10) configured to be a decoder, according to a non-restrictive embodiment of the present principles.

In a step 1300, the different parameters of device 100 are updated. In particular, the stream is obtained from a source, a point of view is determined in the space of the point cloud and an un-projection method is initialized. In a variant, the point of view and or the un-projection method are obtained from the stream.

In a step 1301, an image and a patch data item list are decoded from the stream. A patch data item list may be associated with a group of pictures. A patch data item comprises a location of the associated picture (i.e. patch) in the image, an information relative to the solid angle used for the projection map of the picture, and a description of the part of the three-dimensional space encompassing part of the three-dimensional scene projected onto the picture as described in relation with FIG. 7. An image comprises a set of pictures (also called patches) packed in the pixel grid of the image. In a step 1302, patches are unpacked from the picture according to patch data items by using the location information in the associated patch data item. The information identifying an area within the picture comprised in each patch data item describes the location and the shape of the image patch in the pixel grid of the picture.

This information, the angular range of the patch data item and the picture resolution are used to unpack image patches. A patch data item also comprises a depth range that is used at step 1303. A patch data item also comprise an information relative to the solid angle used for projecting points of the 3D scene onto a projection map. This information is used by the decoder to reorient the reference vector for the un-projection of the pixels of the picture; said un-projection creating points in the rendering 3D space. Each unpacked image patch is associated with the corresponding patch data item. In a step 1303, pixels of unpacked images are un-projected according to associated patch data item. The depth information stored in a pixel is decoded according to the depth range allowing an optimal use of the dynamic of the pixel, the depth being encoded for example on 10 bits or 15 bits. The location in space of the decoded point is then computed according to the coordinates of the pixel within the image patch, the angular range and the decoded depth. The direction of the point according to the point of view is, for example, linearly interpolated according to the coordinates of the pixel within the frame of reference of the image patch and the angular range ([θmin, θmax],[φmin, φmax]) comprised in the associated patch data item. The point is projected in the determined direction at a distance from the point of view corresponding to the determined depth. If pixels of the picture store a color value or if a color value is stored in a picture paired with depth picture, this color value is assigned to the projected point.

Naturally, the present disclosure is not limited to the embodiments previously described.

In particular, the present disclosure is not limited to methods and devices for encoding/decoding a stream carrying data representative of a volumetric scene (i.e. a sequence of three-dimension point clouds) but also extends to methods of encoding/decoding a sequence of two-dimension point clouds and to any devices implementing these methods and notably any devices comprising at least one CPU and/or at least one GPU.

The present disclosure also relates to a method (and a device configured) for displaying images rendered from the data stream comprising the information representative of the volumetric scene and to a method (and a device configured) for rendering and displaying the object with a flat video.

The present disclosure also relates to a method (and a device configured) for transmitting and/or receiving the stream.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of encoding a three-dimensional point cloud in a stream, the method comprising:
   generating a plurality of projection maps by:
   a. determining a part of the three-dimensional point cloud comprising points of a region of the 3D space determined according to a view angle from a point of view and visible from said point of view;
   b. projecting said part of the three-dimensional point cloud onto a projection map; and
   c. removing said part of the three-dimensional point cloud from the point cloud; rotating the view angle; and iterating a, b and c;
   generating a plurality of pictures from said plurality of projection maps, a picture being a depth consistent cluster of adjacent pixels of a projection map;
   packing at least one picture of said plurality of pictures in an image and determining data comprising for each of said at least one picture:
   a location of said picture in said image,
   an information relative to the view angle used for the projection map of said picture, and
   a description of a part of the three-dimensional space encompassing the part of the three-dimensional point cloud projected onto said picture; and
   encoding said image and said data in said stream.

2. A device adapted to encode a three-dimensional point cloud in a stream, the device comprising:

a memory associated with a processor configured to:
  generate a plurality of projection maps by:
    a. determining a part of the three-dimensional point cloud comprising points of a region of the 3D space determined according to a view angle from a point of view and visible from said point of view;
    b. projecting said part of the three-dimensional point cloud onto a projection map; and
    c. removing said part of the three-dimensional point cloud from the point cloud; rotating the view angle; and iterating a, b and c;
  generate a plurality of pictures from said plurality of projection maps, a picture being a depth consistent cluster of adjacent pixels of a projection map;
  pack at least one picture of said plurality of pictures in an image and determining a data comprising for each of said at least one picture:
    a location of said picture in said image,
    an information relative to the view angle used for the projection map of said picture, and
    a description of a part of the three-dimensional space encompassing the part of the three-dimensional point cloud projected onto said picture; and
  encode said image and said data in said stream.

3. The method according to claim 1, wherein said rotating the view angle is performed by permuting the axis order of a reference frame of the three-dimensional space and wherein said information relative to the view angle is an identifier of said permutation.

4. The method according to claim 1, wherein said projection is an equirectangular projection.

5. The method according to claim 1, wherein points of the three-dimensional point cloud comprise a color attribute and wherein two images are generated and encoded in the stream with said data, one image packing at least one picture with a depth attribute and the other image packing at least one picture with a color attribute.

6. The method according to claim 1, wherein said data further comprises an information indicating whether a picture has been rotated during the packing in the image.

7. The device according to claim 2, wherein said rotating the view angle is performed by permuting the axis order of a reference frame of the three-dimensional space and wherein said information relative to the view angle is an identifier of said permutation.

8. The device according to claim 2, wherein said projection is an equirectangular projection.

9. The method according to claim 3, wherein said projection is an equirectangular projection.

10. The method according to claim 3, wherein points of the three-dimensional point cloud comprise a color attribute and wherein two images are generated and encoded in the stream with said data, one image packing at least one picture with a depth attribute and the other image packing at least one picture with a color attribute.

11. The method according to claim 4, wherein points of the three-dimensional point cloud comprise a color attribute and wherein two images are generated and encoded in the stream with said data, one image packing at least one picture with a depth attribute and the other image packing at least one picture with a color attribute.

12. The method according to claim 3, wherein said data further comprises an information indicating whether a picture has been rotated during the packing in the image.

13. The method according to claim 4, wherein said data further comprises an information indicating whether a picture has been rotated during the packing in the image.

14. The device according to claim 7, wherein said projection is an equirectangular projection.

15. The device according to claim 2, wherein points of the three-dimensional point cloud comprise a color attribute and wherein two images are generated and encoded in the stream with said data, one image packing at least one picture with a depth attribute and the other image packing at least one picture with a color attribute.

16. The device according to claim 7, wherein points of the three-dimensional point cloud comprise a color attribute and wherein two images are generated and encoded in the stream with said data, one image packing at least one picture with a depth attribute and the other image packing at least one picture with a color attribute.

17. The device according to claim 14, wherein points of the three-dimensional point cloud comprise a color attribute and wherein two images are generated and encoded in the stream with said data, one image packing at least one picture with a depth attribute and the other image packing at least one picture with a color attribute.

18. The device according to claim 2, wherein said data further comprises an information indicating whether a picture has been rotated during the packing in the image.

19. The device according to claim 7, wherein said data further comprises an information indicating whether a picture has been rotated during the packing in the image.

20. The device according to claim 14, wherein said data further comprises an information indicating whether a picture has been rotated during the packing in the image.

* * * * *

UNITED STATES PATENT AND TRADEMARK OFFICE
CERTIFICATE OF CORRECTION

| | | |
|---|---|---|
| PATENT NO. | : 11,095,920 B2 | |
| APPLICATION NO. | : 16/769807 | |
| DATED | : August 17, 2021 | |
| INVENTOR(S) | : Julien Fleureau, Bertrand Chupeau and Franck Thudor | |

It is certified that error appears in the above-identified patent and that said Letters Patent is hereby corrected as shown below:

On the Title Page

Column 1, Item (73) Assignee: Delete "Holdgins," and add -- Holdings, --

Signed and Sealed this
Twenty-eighth Day of March, 2023

Katherine Kelly Vidal
*Director of the United States Patent and Trademark Office*